United States Patent [19]

Belart

[11] 4,244,185
[45] Jan. 13, 1981

[54] MASTER CYLINDER FOR HYDRAULIC BRAKE SYSTEM

[75] Inventor: Juan Belart, Walldorf, Fed. Rep. of Germany

[73] Assignee: ITT Industries, Inc., New York, N.Y.

[21] Appl. No.: 920,747

[22] Filed: Jun. 29, 1978

[30] Foreign Application Priority Data

Jul. 30, 1977 [DE] Fed. Rep. of Germany ....... 2734551

[51] Int. Cl.³ .............................................. B60T 13/20
[52] U.S. Cl. ...................................... 60/550; 60/567; 60/576; 60/577
[58] Field of Search ................... 60/547 R, 548, 550, 60/562, 581, 576, 577, 567, 582; 91/173

[56] References Cited

U.S. PATENT DOCUMENTS

| 3,120,156 | 2/1964 | Ayers, Jr. | 60/550 |
| 3,253,409 | 5/1966 | Kellogg | 60/547 |
| 3,559,406 | 2/1971 | Gardner | 60/550 |
| 4,050,251 | 9/1977 | Carre | 60/550 |
| 4,110,985 | 9/1978 | Gordon | 60/550 |

FOREIGN PATENT DOCUMENTS

| 2460529 | 7/1975 | Fed. Rep. of Germany. | |
| 4639375 | 4/1967 | Japan | 60/582 |
| 1490605 | 11/1977 | United Kingdom. | |
| 1505451 | 3/1978 | United Kingdom. | |

Primary Examiner—Abraham Hershkovitz
Attorney, Agent, or Firm—John T. O'Halloran; Alfred C. Hill

[57] ABSTRACT

A master cylinder includes a master cylinder piston which is slidable by a booster with a hydraulic transmission interposed between the booster and the master cylinder piston. The booster includes two booster pistons the first of which has the same effective area as the master cylinder piston. With the system intact, the master cylinder piston is shifted as a result of the pressure fluid displaced by the two booster pistons to provide the hydraulic transmission. In the event of failure of the booster, the master cylinder piston is actuated directly by mechanical means through the first booster piston with the hydraulic transmission thereby being omitted.

6 Claims, 2 Drawing Figures

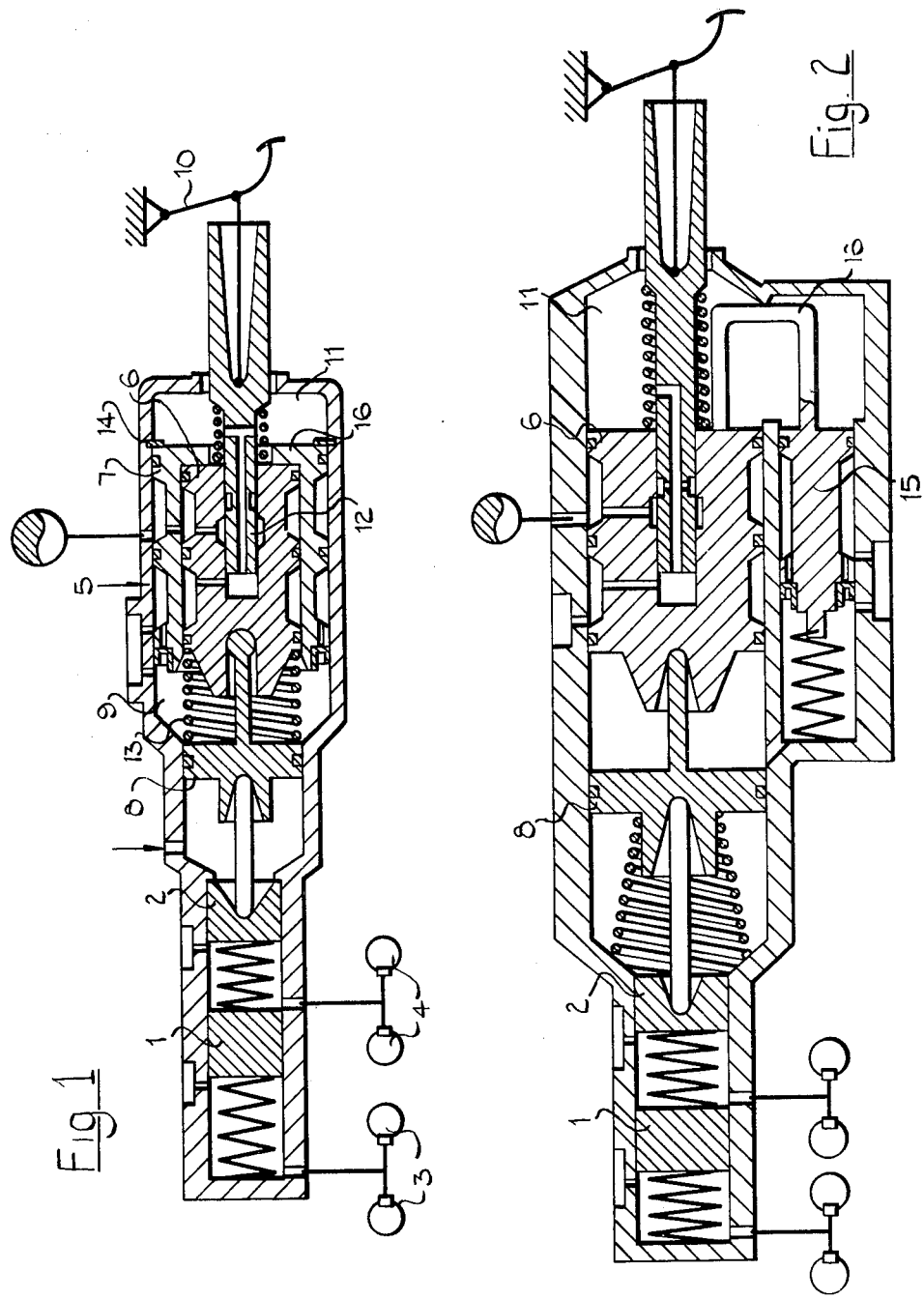

MASTER CYLINDER FOR HYDRAULIC BRAKE SYSTEM

BACKGROUND OF THE INVENTION

The present invention relates to a master cylinder for hydraulic brake systems which is actuatable both by the force applied to a brake pedal exclusively and by an auxiliary force, with a master cylinder piston being slidable by a booster by interposing a hydraulic transmission between the booster and the master cylinder piston.

A master cylinder of this type is shown in German printed patent application DT-OS No. 2,460,529. In this known master cylinder, the hydraulic transmission may be disconnected automatically in the event of failure of the auxiliary force by means of a valve arrangement. When the brake is applied without the auxiliary force, this arrangement makes it possible to generate the braking pressure directly by the relatively small area of the master cylinder so that a sufficiently high braking pressure can still be achieved by making use of the admissible pedal travel. If the auxiliary force were used without the hydraulic transmission interposed between a booster and the master cylinder piston, the maximum possible braking pressure would be limited by the fact that the brake pedal could be stepped down to the stop by the auxiliary force.

A disadvantage of this known master cylinder is that for automatic disconnection of the hydraulic transmission a valve arrangement is required which operates in dependence on the auxiliary force. This makes the master cylinder more expensive. In addition, it increases the danger of failure.

SUMMARY OF THE INVENTION

It is the object of the present invention to provide a master cylinder of the type initially referred to such that upon failure of the auxiliary force the master cylinder operates with a transmission ratio different from the ratio that was present before the failure occurred without requiring a valve arrangement.

A feature of the present invention is the provision of an improvement in a master cylinder for hydraulic brake systems, the master cylinder being actuatable both by the force applied to a brake pedal exclusively and by an auxiliary force, the master cylinder including a master cylinder piston slidable by a booster with a hydraulic transmission interposed between the booster and the master cylinder piston, the improvement comprising: a master cylinder actuating piston coupled with the master cylinder piston; and the booster includes two booster pistons, a first of the two booster pistons having the same effective area as the master cylinder actuating piston and disposed coaxially of the master cylinder between the master cylinder actuating piston and the brake pedal, and a second of the two booster pistons abutting against the first booster piston adjacent the brake pedal.

The advantages of this invention are in particular that both booster pistons are always jointly slidable when the auxiliary force is available. As a result, a hydraulic transmission is active between the booster piston and the master cylinder piston or a master cylinder actuating piston, respectively. If the auxiliary force fails, the booster piston having the larger effective area can be displaced by the brake pedal alone. The hydraulic transmission between the booster piston and the master cylinder piston is thus omitted so that sufficient braking pressure can be built up with the pedal force alone. It will be readily understood that this is a very simple method of achieving the effect of a hydraulic transmission adapted to be disconnected without the provision of a valve arrangement.

If an advantageous embodiment of the invention, the two booster pistons are coaxially arranged. This design results in a particularly compact master cylinder.

When arranging the two booster pistons in parallel according to another embodiment of the invention, the result is a master cylinder lending itself to particularly inexpensive manufacture because it eliminates tolerance problems with respect to the two booster pistons. Neither is there any danger of the booster pistons becoming jammed because both booster pistons are guided independently of one another.

BRIEF DESCRIPTION OF THE DRAWING

Above-mentioned and other features and objects of this invention will become more apparent by reference to the following description taken in conjunction with the accompanying drawing, in which:

FIG. 1 is a schematic longitudinal cross-sectional view of a first embodiment of a master cylinder in accordance with the principles of the present invention; and FIG. 2 is a schematic longitudinal cross-sectional view of a second embodiment of a master cylinder in accordance with the principles of the present invention.

DESCRIPTION OF THE PREFERRED EMBODIMENTS

The master cylinder illustrated in FIG. 1 has two master cylinder pistons 1 and 2 through which pressure fluid may be transmitted to a first pair of brakes 3 and a second pair of brakes 4 in the usual manner.

A booster 5 is arranged coaxially with master cylinder pistons 1 and 2. Booster 5 has two booster pistons 6 and 7, one being coaxially inserted into the other. Booster piston 7 has a collar 16 bearing against booster piston 6 on the side close to the brake pedal 10. The inner booster piston 6 bears against a master cylinder actuating piston 8 which in turn bears against master cylinder piston 2. The effective area of master cylinder actuating piston 8 corresponds to that of booster piston 6. As a result of the arrangement of booster pistons 6 and 7, a pressure transmitting chamber 9 is formed in booster 5, and a booster chamber 11 is formed on the side of brake pedal 10 serving to actuate the master cylinder.

Connected with brake pedal 10 is a valve spool 12 adapted to permit metered delivery of pressure fluid into booster chamber 11 in the usual manner. By a return spring 13 acting on booster piston 6, both booster pistons 6 and 7 are held in a rest position which is defined by a stop 14.

Operation of the master cylinder described is as follows:

When brake pedal 10 is depressed, valve spool 12 is displaced to the left when viewing the drawing until a return connection is closed off and pressure fluid is metered into booster chamber 11. As a result, both booster pistons 6 and 7 move similarly to the left, thereby urging pressure fluid out of pressure transmitting chamber 9. Since the effective area of master cylinder actuating piston 8 is smaller than the sum of the effective areas of both booster pistons 6 and 7, master cylinder actuating piston 8 moves away from booster piston 6. The pressure is transmitted, in accordance with the transmission ratio, by booster piston 6 and 7 to master cylinder actuating piston 8 and thus on to master cylinder pistons 1 and 2. If pressure cannot build up in booster chamber 11 because a fault has occurred, booster piston 6 will mechanically displace master cylinder actuating piston 8. Since the effective areas of both pistons 6 and 8 are identical, the force exerted is not diminished. On the contrary, the pedal force is transmitted to master cylinder pistons 1 and 2 undiminished.

In the embodiment of FIG. 2, two master cylinder pistons 1 and 2, a master cylinder actuating piston 8 and a booster piston 6 are likewise arranged coaxially one behind the other. As in the embodiment of FIG. 1, booster piston 6 has the same effective area as master cylinder actuating piston 8. Parallel to the booster piston 6 is a second booster piston 15 having a U-shaped extension 16 bearing against booster piston 6 on the side close to pedal 10.

The mode of operation of the master cylinder of FIG. 2 corresponds to that of the master cylinder of FIG. 1. Provided auxiliary energy is present in booster chamber 11, both booster piston 6 and 15 will become displaced. In the event of failure of the auxiliary energy, booster piston 6 will become mechanically displaced.

While I have described above the principles of my invention in connection with specific apparatus it is to be clearly understood that this description is made only by way of example and not as a limitation to the scope of my invention as set forth in the objects thereof and in the accompanying claims.

I claim:

1. An improvement in a master cylinder for hydraulic brake systems, said master cylinder being actuatable both by the force applied to a brake pedal exclusively and by an auxiliary force, said master cylinder including a master cylinder piston slideable by a booster with a hydraulic transmission interposed between said booster and said master cylinder piston, said improvement comprising:
   a master cylinder actuating piston directly bearing mechanically on said master cylinder piston; and
   said booster includes
      two booster pistons, a first of said two booster pistons having the same effective area as said master cylinder actuating piston and disposed coaxially of said master cylinder between said master cylinder actuating piston and said brake pedal, and a second of said two booster pistons having a means connected to an end thereof adjacent said brake pedal abutting against an end of said first booster piston adjacent said brake pedal, said first and second booster pistons being hydraulically coupled to said master cylinder actuating piston for hydraulic operation thereof when said auxiliary force is present and only said first booster piston directly bearing mechanically on said master cylinder actuating piston for mechanical operation thereof when said auxiliary force fails.

2. An improvement according to claim 1, wherein said first and second booster pistons are disposed coaxially with respect to each other.

3. An improvement according to claim 2, wherein said second booster piston encloses said first booster piston, and said second booster piston includes an inwardly extending collar as said means bearing against said end of said first booster piston adjacent said brake pedal.

4. An improvement according to claim 1, wherein said first and second booster pistons are disposed parallel with respect to each other.

5. An improvement according to claim 4, wherein said second booster piston includes
   a U-shaped extension as said means bearing against said end of said first booster piston adjacent said brake pedal.

6. An improvement in a master cylinder for hydraulic brake systems, said master cylinder being actuatable both by the force applied to a brake exclusively and by an auxiliary force, said master cylinder including a master cylinder piston slideable by a booster with a hydraulic transmission interposed between said booster and said master cylinder piston,, said improvement comprising:
   a master cylinder actuating piston coupled with said master cylinder piston; and
   said booster includes
      two booster pistons disposed coaxial with respect to each other, a first of said two booster pistons having the same effective area as said master cylinder actuating piston and disposed coaxially of said master cylinder between said master cylinder actuating piston and said brake pedal, and a second of said two booster pistons enclosing said first booster piston and including an inwardly extending collar bearing against an end of said first booster piston adjacent said brake pedal.

* * * * *